US011267291B2

(12) United States Patent
Takano

(10) Patent No.: US 11,267,291 B2
(45) Date of Patent: Mar. 8, 2022

(54) TIRE

(71) Applicant: Sumitomo Rubber Industries, Ltd., Kobe (JP)

(72) Inventor: Hirokazu Takano, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 233 days.

(21) Appl. No.: 15/955,447

(22) Filed: Apr. 17, 2018

(65) Prior Publication Data

US 2018/0326792 A1 Nov. 15, 2018

(30) Foreign Application Priority Data

May 9, 2017 (JP) ............................. JP2017-093253

(51) Int. Cl.
*B60C 11/11* (2006.01)
*B60C 11/03* (2006.01)
(Continued)

(52) U.S. Cl.
CPC ...... *B60C 11/0306* (2013.01); *B60C 11/1204* (2013.01); *B60C 11/1384* (2013.01); *B60C 11/11* (2013.01); *B60C 2011/0346* (2013.01); *B60C 2011/0358* (2013.01); *B60C 2011/0362* (2013.01); *B60C 2011/0381* (2013.01); *B60C 2011/1213* (2013.01);
(Continued)

(58) Field of Classification Search
CPC ......... B60C 11/0306; B60C 2011/0346; B60C 2011/0369; B60C 11/1392; B60C 2011/0358; B60C 11/1204; B60C 11/11; B60C 2011/1213; B60C 2011/1254
See application file for complete search history.

(56) References Cited

U.S. PATENT DOCUMENTS 6,000,450 A * 12/1999 Kishimoto .............. B60C 11/00 152/209.1
6,571,844 B1 * 6/2003 Ochi ....................... B60C 11/11 152/209.18

(Continued)

FOREIGN PATENT DOCUMENTS

| | | | |
|---|---|---|---|
| GB | 1024836 | * | 2/1963 |
| JP | 2014-162259 A | | 9/2014 |

*Primary Examiner* — Timothy Kennedy
*Assistant Examiner* — Farah Taufiq
(74) *Attorney, Agent, or Firm* — Birch, Stewart, Kolasch & Birch, LLP

(57) ABSTRACT

A tire comprises a tread portion 2 comprising at least a first main groove 3 and a second main groove 4 extending continuously in a tire circumferential direction. The first main groove 3 comprises a first oblique portion 11 inclined with respect to the tire circumferential direction and a second oblique portion 12 connected with the first oblique portion and inclined in an opposite direction to the first oblique portion 11. The second main groove 4 comprises a third oblique portion 13 inclined in a same direction as the first oblique portion 11 with respect to the tire circumferential direction, a fourth oblique portion 14 inclined in an opposite direction to the third oblique portion 13, and a longitudinal groove portion 15 disposed between the third and fourth oblique portions 13 and 14 so that they are not directly connected and extending along the tire circumferential direction.

20 Claims, 9 Drawing Sheets

(51) Int. Cl.
*B60C 11/12* (2006.01)
*B60C 11/13* (2006.01)

(52) U.S. Cl.
CPC ... *B60C 2011/1254* (2013.01); *B60C 2200/04* (2013.01); *B60C 2200/14* (2013.01)

(56) References Cited

U.S. PATENT DOCUMENTS

| | | | | |
|---|---|---|---|---|
| 2014/0230982 | A1 | 8/2014 | Ninomiya et al. | |
| 2014/0230983 | A1* | 8/2014 | Tagashira | B60C 11/1259 152/209.23 |
| 2014/0238567 | A1* | 8/2014 | Iwasaki | B60C 11/0306 152/209.18 |
| 2015/0273949 | A1* | 10/2015 | Arai | B60C 11/11 152/209.18 |
| 2016/0082779 | A1* | 3/2016 | Maehara | B60C 11/1236 152/209.27 |
| 2016/0121659 | A1* | 5/2016 | Kageyama | B60C 11/11 152/209.24 |
| 2016/0361952 | A1* | 12/2016 | Fujioka | B60C 11/0306 |
| 2017/0120691 | A1* | 5/2017 | Arai | B60C 11/11 |
| 2017/0136830 | A1* | 5/2017 | Kuwano | B60C 11/11 |
| 2018/0001708 | A1* | 1/2018 | Fujioka | B60C 15/024 |

* cited by examiner

TIRE

TECHNICAL FIELD

The present invention relates to a tire capable of exerting excellent off-road performance and noise performance.

BACKGROUND ART

Japanese unexamined Patent Application Publication No. 2014-162259 has proposed a tire provided with a plurality of main grooves extending in a trapezoidal wave-shaped zigzag manner as a tire suitable for running on rough terrain, for example. However, the above tire tends to produce unpleasant noise having high intensity in a specific frequency band when running on an asphalt road surface, for example.

SUMMARY OF THE INVENTION

The present invention was made in view of the above, and a primary object thereof is to provide a tire capable of exerting excellent off-road performance and noise performance.

In one aspect of the present invention, a tire comprises a tread portion comprising at least a first main groove and a second main groove extending continuously in a tire circumferential direction, wherein the first main groove comprises a first oblique portion inclined with respect to the tire circumferential direction and a second oblique portion connected with the first oblique portion and inclined in an opposite direction to the first oblique portion, and the second main groove comprises a third oblique portion inclined in a same direction as the first oblique portion with respect to the tire circumferential direction, a fourth oblique portion inclined in an opposite direction to the third oblique portion, and a longitudinal groove portion disposed between the third oblique portion and the fourth oblique portion so that they are not directly connected and extending along the tire circumferential direction.

In another aspect of the invention, it is preferred that the second main groove has a smaller groove width than that of the first main groove.

In another aspect of the invention, it is preferred that the third oblique portion is inclined at a larger angle than the first oblique portion with respect to the tire circumferential direction.

In another aspect of the invention, it is preferred that the third oblique portion is inclined at a smaller angle than the second oblique portion with respect to the tire circumferential direction.

In another aspect of the invention, it is preferred that the fourth oblique portion is inclined at a larger angle than the first oblique portion with respect to the tire circumferential direction.

In another aspect of the invention, it is preferred that the fourth oblique portion is inclined at a smaller angle than the second oblique portion with respect to the tire circumferential direction.

In another aspect of the invention, it is preferred that each of the third oblique portion and the fourth oblique portion has a smaller length in the tire circumferential direction than that of the first oblique portion.

In another aspect of the invention, it is preferred that the longitudinal groove portion has a smaller length in the tire circumferential direction than that of the first oblique portion.

DESCRIPTION OF THE PREFERRED EMBODIMENT

An embodiment of the present invention will now be described in conjunction with accompanying drawings.

Figure 1:
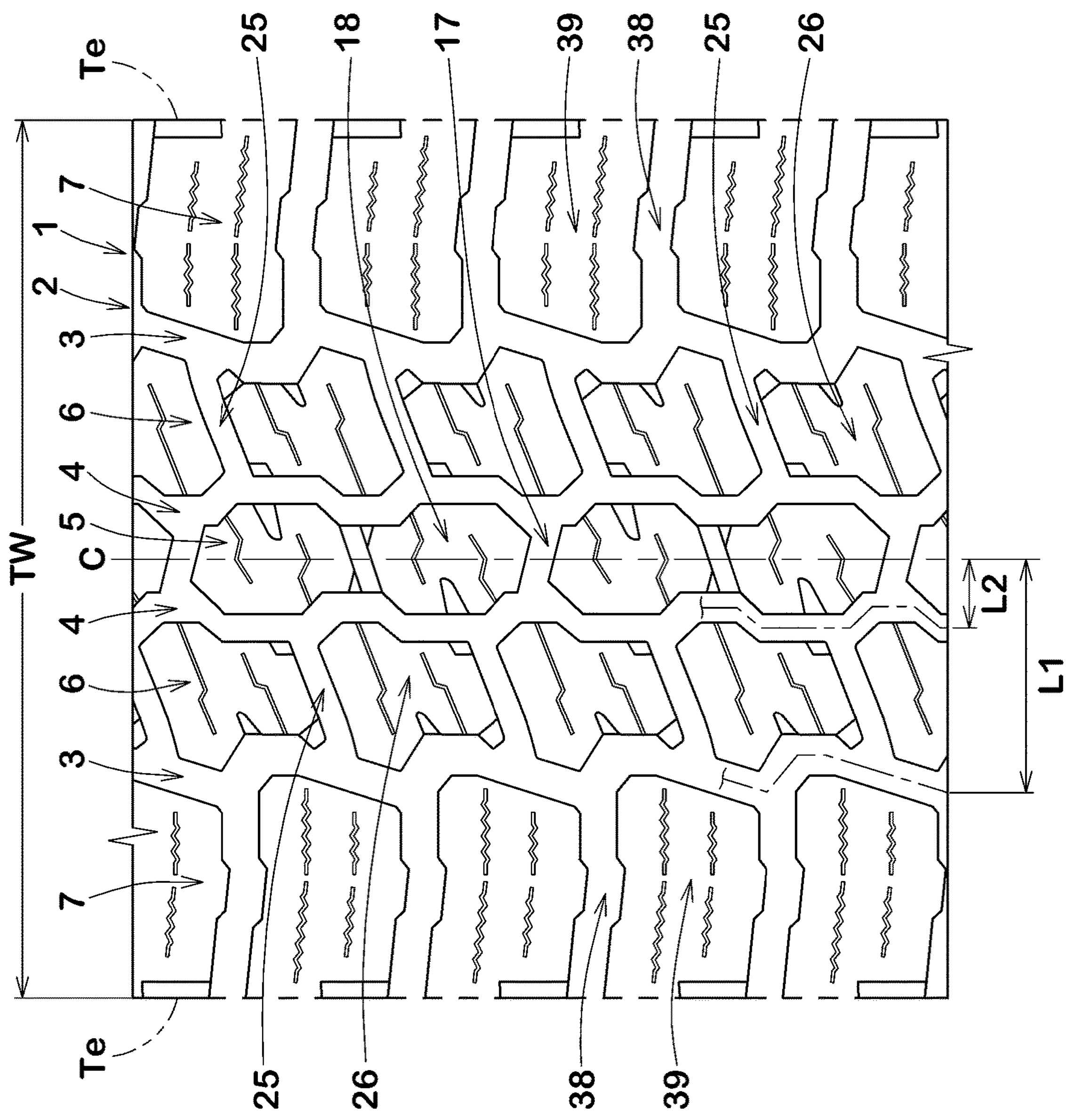
FIG. 1 is a development view of a tread portion of a tire according to an embodiment of the present invention.

FIG. 1 is a development view of a tread portion 2 of a tire 1 according to an embodiment of the present invention. The tire 1 in this embodiment is suitably used for a four-wheel drive vehicle such as an SUV that can run not only on a paved road but also on rough terrain, for example. However, the tire of the present invention is not limited to such an embodiment. In another embodiment of the present invention, the tire 1 can be used as a tire for heavy load, a non-pneumatic tire which is not filled with pressurized air thereinside, or the like, for example.

As shown in FIG. 1, the tread portion 2 is provided at least with first main grooves 3 and second main grooves 4 extending continuously in a tire circumferential direction, for example.

The first main grooves 3 are provided one by one between one of tread edges Te and a tire equator C and between another one of the tread edges Te and the tire equator C, for example.

The "tread edges Te" are defined as outermost ground contacting positions in a tire axial direction when the tire 1 in a standard state is in contact with a flat surface with zero camber angle by being loaded with a standard tire load. The is a state in which the tire 1 is mounted on a standard rim, inflated to a standard pressure, and loaded with no tire load. Unless otherwise noted, dimensions and the like of various parts of the tire are values measured in the standard state.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The second main grooves 4 is provided one by one between each of the first main grooves 3 and the tire equator c, for example. In this embodiment, a pair of the second main grooves 4 are provided so as to sandwich the tire equator c, for example. The tread portion 2 may be provided with only one second main groove 4 on the tire equator C, for example.

The tread portion 2 in this embodiment is provided with two first main grooves 3 and two second main grooves 4 arranged between the first main grooves 3. However, the present invention is not limited to such an arrangement of the main grooves 3 and 4.

It is preferred that a distance L1 between a groove center line of each of the first main grooves 3 and the tire equator c is in a range of from 0.20 to 0.30 times a tread width TW, for example. It is preferred that a distance L2 between a groove center line of each of the second main grooves 4 and the tire equator c is in a range of from 0.05 to 0.12 times the tread width TW, for example. Note that the tread width TW is defined as a distance in the tire axial direction between the tread edges Te of the tire 1 in the standard state.

Figure 2A:
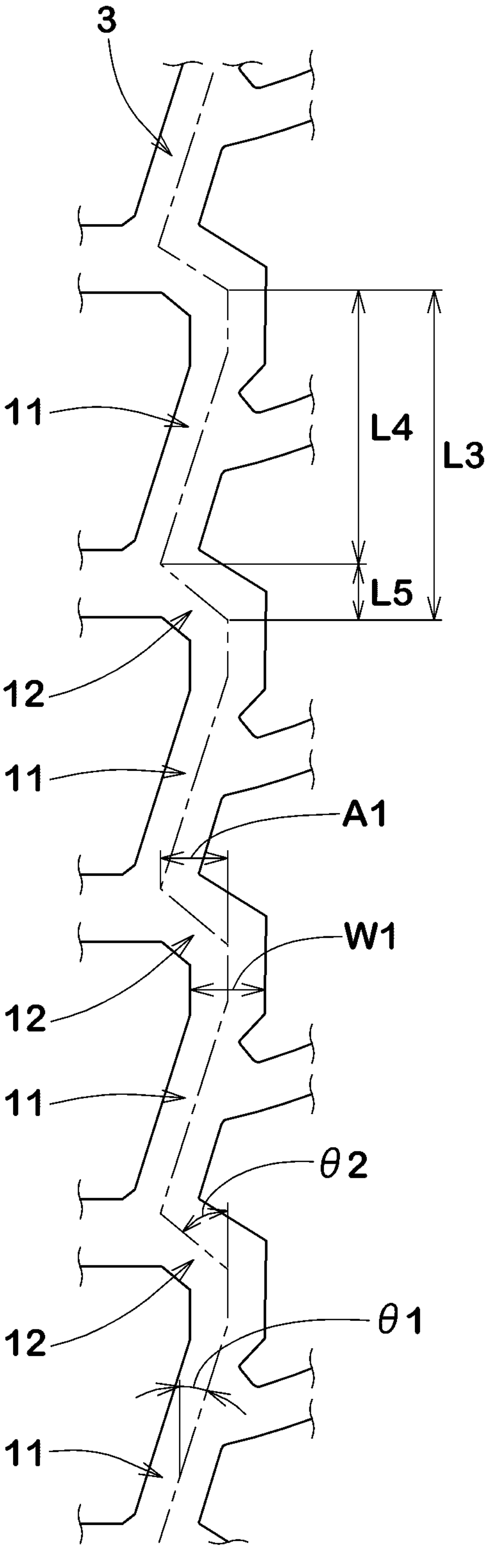
FIG. 2A is an enlarged view of a contour of one of first main grooves of FIG. 1.
Figure 2B:
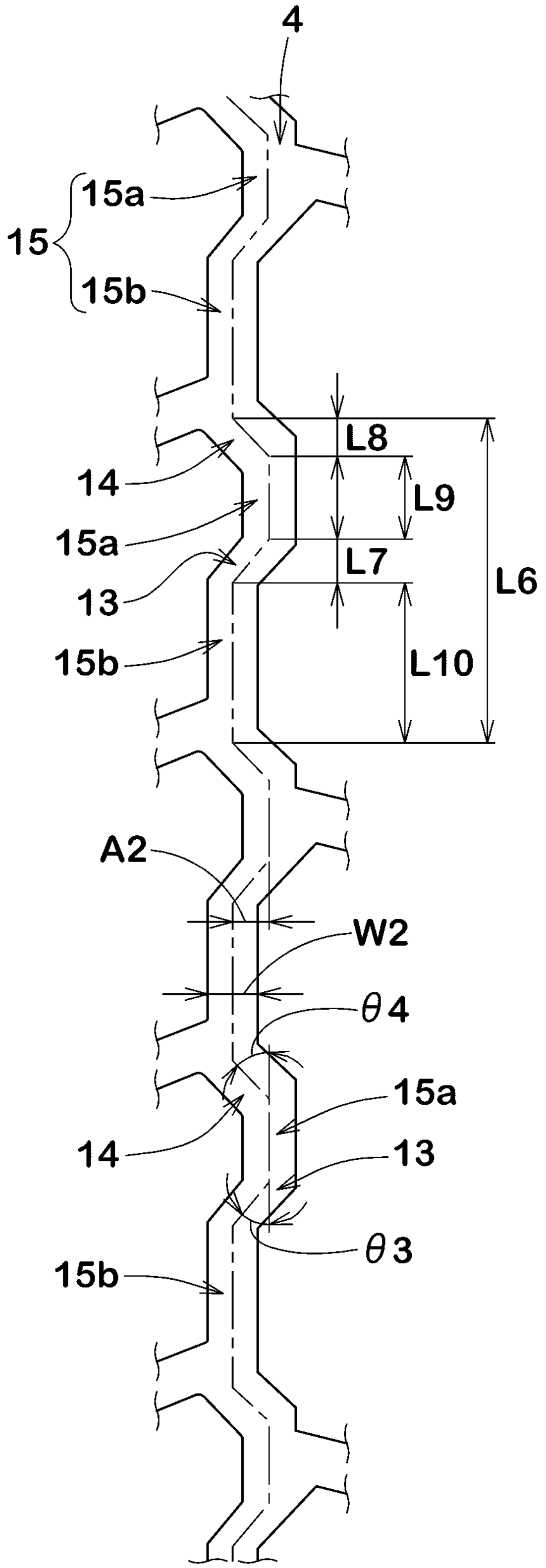
FIG. 2B is an enlarged view of a contour of one of second main grooves of FIG. 1.

FIG. 2A is an enlarged view of one of the first main grooves 3. FIG. 2B is an enlarged view of one of the second main grooves 4. As shown in FIGS. 2A and 2B, each of the first main grooves 3 includes first oblique portions 11 and second oblique portions 12. The first oblique portions 11 are inclined in one direction with respect to the tire circumferential direction. The second oblique portions 12 are connected with the first oblique portions 11 and are inclined in the opposite direction to the first oblique portions 11. In each of the first main grooves 3 in this embodiment, the first oblique portions 11 and the second oblique portions 12 are arranged alternately in the tire circumferential direction so as to form a zigzag shape.

Each of the second main grooves 4 includes third oblique portions 13, fourth oblique portions 14, and longitudinal groove portions 15. The third oblique portions 13 are inclined in the same direction as the first oblique portions 11 with respect to the tire circumferential direction. The fourth oblique portions 14 are inclined in the opposite direction to the third oblique portions 13. Each of the longitudinal groove portions 15 is disposed between each pair of the third oblique portion 13 and the fourth oblique portion 14 so that the third oblique portion 13 and the fourth oblique portion 14 are not directly connected and extend along the tire circumferential direction.

Each of the longitudinal groove portions 15 includes an inner longitudinal groove portion 15*a* and an outer longitudinal groove portion 15*b* arranged at different positions in the tire axial direction, for example. The inner longitudinal groove portion 15*a* is formed so as to connect between an end portion arranged on one side in the tire axial direction (on a side of the tire equator C in this embodiment) of the third oblique portion 13 and an end portion arranged on the one side in the tire axial direction of the fourth oblique portion 14. The outer longitudinal groove portion 15*b* is formed so as to connect between an end portion arranged on the other side in the tire axial direction (on a side of the tread edge Te in this embodiment) of the third oblique portion 13 and an end portion arranged on the other side in the tire axial direction of the fourth oblique portion 14. Thereby, a groove center line of the outer longitudinal groove portion 15*b* is located on an outer side in the tire axial direction with respect to a groove center line of the inner longitudinal groove portion 15*a*. In this embodiment, a plurality of zigzag elements each including the third oblique portion 13, the inner longitudinal groove portion 15*a*, the fourth oblique portion 14, and the outer longitudinal groove portion 15*b* is provided in the tire circumferential direction. Thereby, each of the second main grooves 4 is configured in a zigzag shape having a trapezoidal wave shape.

Each of the oblique portions provides frictional force in multiple directions during running on rough terrain, therefore, the first main grooves 3 and the second main grooves 4 exert excellent off-road performance. Further, in the first main grooves 3, the first oblique portions 11 and the second oblique portions 12 are connected with each other, on the other hand, the second main grooves 4 includes longitudinal groove portions 15 arranged between the third oblique portions 13 and the fourth oblique portions 14. Thereby, frequency bands of noise (including air column resonance sound and impact sound when the groove edges touch the ground, etc.) generated by each of the main grooves 3 and 4 are dispersed. Therefore, the tire of the present invention can suppress generation of unpleasant noise.

It is preferred that, in the first main grooves 3 in this embodiment, a length L4 (meaning a length of a groove center line thereof, hereinafter the same applies.) in the tire circumferential direction of each of the first oblique portions 11 is larger than a length L5 in the tire circumferential of each of the second oblique portions 12, for example. Thereby, the frequency bands are dispersed between the impact sound generated when groove edges of the first oblique portions 11 contact with the ground and the impact sound generated when groove edges of the second oblique portions 12 contact with the ground, therefore, even better noise performance is obtained.

It is preferred that the length L4 of each of the first oblique portions 11 is in a range of from 0.75 to 0.85 times a total length L3 of the first oblique portion 11 and the second oblique portion 12, for example. It is preferred that a ratio L4/L5 of the length L4 of the first oblique portion 11 and the length L5 of the second oblique portion 12 is in a range of from 3.00 to 5.80, for example. Therefore, the lengths of the first oblique portions 11 are sufficiently secured, therefore, not only the above-mentioned effects but also excellent wet performance can be obtained.

It is preferred that a maximum angle θ1 (meaning an angle of the groove center line, hereinafter the same applies.) of each of the first oblique portions 11 with respect to the tire circumferential direction is in a range of from 15 to 25 degrees, for example. The first oblique portions 11 configured as such provide frictional force in the tire axial direction and in the tire circumferential direction in a good balance during running on rough terrain. Note that the first oblique portions 11 may be configured such that the angles thereof with respect to the tire circumferential direction partially change, for example.

It is preferred that the length L5 in the tire circumferential direction of each of the second oblique portions 12 is in a range of from 0.10 to 0.25 times the total length L3, for example.

It is preferred that the second oblique portions 12 are inclined at angles larger than those of the first oblique portions 11 with respect to the tire circumferential direction, for example. It is preferred that a maximum angle θ2 with respect to the tire circumferential direction of each of the second oblique portions is in a range of from 45 to 60 degrees, for example. Thereby, it is possible that the second oblique portions 12 provide large traction during running on a muddy road, for example.

In order to improve the wet performance while exerting the above-mentioned effects, it is preferred that an amplitude A1 (meaning an amplitude of the groove center line, hereinafter the same applies.) in the tire axial direction of each of the first main grooves 3 is in a range of from 3.0% to 5.0% of the tread width TW, for example.

It is preferred that a length L7 in the tire circumferential direction of each of the third oblique portions 13 is in a range of from 0.08 to 0.20 times a total length L6 of one of the third oblique portions 13, one of the fourth oblique portions 14, one of the inner longitudinal groove portions 15*a*, and one of the outer longitudinal groove portions 15*b*, for example. In a more preferred embodiment, each of the third oblique portions 13 has the length in the tire circumferential direction smaller than that of each of the first oblique portions 11. Thereby, it is possible that the frequency bands of the noise generated by each of the main grooves are further dispersed.

From a similar point of view, it is preferred that the third oblique portions 13 are inclined at angles larger than those of the first oblique portions 11 with respect to the tire circumferential direction, for example. Further, it is preferred that the third oblique portions 13 are inclined at angles smaller than those of the second oblique portions 12 with respect to the tire circumferential direction, for example. Specifically, it is preferred that a maximum angle θ3 of each of the third oblique portions 13 with respect to the tire circumferential direction is in a range of from 30 to 50 degrees, for example.

It is preferred that a length L8 in the tire circumferential direction of each of the fourth oblique portions 14 is in a range of from 0.08 to 0.20 times the total length L6, for example. In a preferred embodiment, each of the fourth oblique portions 14 has the length in the tire circumferential direction smaller than that of each of the first oblique portions 11, for example. The fourth oblique portions 14 configured as such, together with the third oblique portions 13, can further disperse the frequency bands of the noise of each of the main grooves.

It is preferred that each of the fourth oblique portions 14 are inclined at an angle larger than that of each of the first oblique portions 11 with respect to the tire circumferential direction, for example. Further, it is preferred that each of the fourth oblique portions 14 is inclined at the angle smaller than that of each of the second oblique portions 12 with respect to the tire circumferential direction, for example. Specifically, it is preferred that a maximum angle θ4 of each of the fourth oblique portions 14 with respect to the tire circumferential direction is in a range of from 30 to 50 degrees, for example.

It is preferred that each of the inner longitudinal groove portions 15*a* has a length L9 in the tire circumferential direction in a range of from 0.20 to 0.30 times the total length L6, for example. It is preferred that each of the outer longitudinal groove portions 15*b* has a length L10 in the tire circumferential direction in a range of from 0.45 to 0.55 times the total length L6, for example. In a more preferred embodiment, each of the longitudinal groove portions 15*a* and 15*b* has the length in the tire circumferential direction smaller than that of each of the first oblique portions 11, for example. Further, each of the outer longitudinal groove portions 15*b* in this embodiment has the length in the tire circumferential direction larger than that of each of the inner longitudinal groove portions 15*a*, for example. Thereby, the frequency bands of noise generated by the inner longitudinal groove portions 15*a* and the outer longitudinal groove portions 15*b* are dispersed, therefore, it is possible that generation of unpleasant noise is further suppressed.

It is preferred that a ratio L10/L9 of the length L10 of the outer longitudinal groove portion 15*b* and the length L9 of the inner longitudinal groove portion 15*a* is in a range of from 1.50 to 2.50, for example. Thereby, the noise performance, the off-road performance, and the wet performance are improved in a good balance.

It is preferred that an amplitude A2 in the tire axial direction of each of the second main grooves 4 is smaller than the amplitude A1 of each of the first main grooves 3, for example. Specifically, it is preferred that the amplitude A2 of each of the second main grooves 4 is in a range of from 2.0% to 4.0% of the tread width TW (shown in FIG. 1 and the same applies hereinafter.), for example. The second main grooves 4 configured as such, together with the first main grooves 3, can improve the noise performance, the off-road performance, and the wet performance in a good balance.

From a similar point of view, it is preferred that each of the second main grooves 4 has a groove width smaller than that of each of the first main grooves 3, for example. In a preferred embodiment, it is preferred that a groove width W2 of each of the second main grooves 4 is in a range of from 0.70 to 0.90 times a groove width W1 of each of the first main grooves 3, for example. Specifically, it is preferred that each of the first main grooves 3 has the groove width W1 in a range of from 3.5% to 5.5% of the tread width TW, for example. It is preferred that each of the second main grooves 4 has the groove width W2 in a range of from 2.5% to 4.0% of the tread width TW, for example.

In a case of a tire for a passenger car, it is preferred that a groove depth of each of the first main grooves 3 and the second main grooves 4 is in a range of from 5 to 15 mm, for example.

As shown in FIG. 1, the tread portion 2 is provided with five land regions divided by the above-described four main grooves, for example. The tread portion 2 in this embodiment is provided with a crown land region 5, middle land regions 6, and shoulder land regions 7, for example. The crown land region 5 is defined between two second main grooves 4 and is provided on the tire equator C, for example. Each of the middle land regions 6 is defined between one of the first main grooves 3 and its adjacent one of the second main grooves 4, for example. Each of the shoulder land regions 7 is defined between one of the first main grooves 3 and its adjacent one of the tread edges Te, for example. However, the present invention is not limited to such an embodiment.

Figure 3:
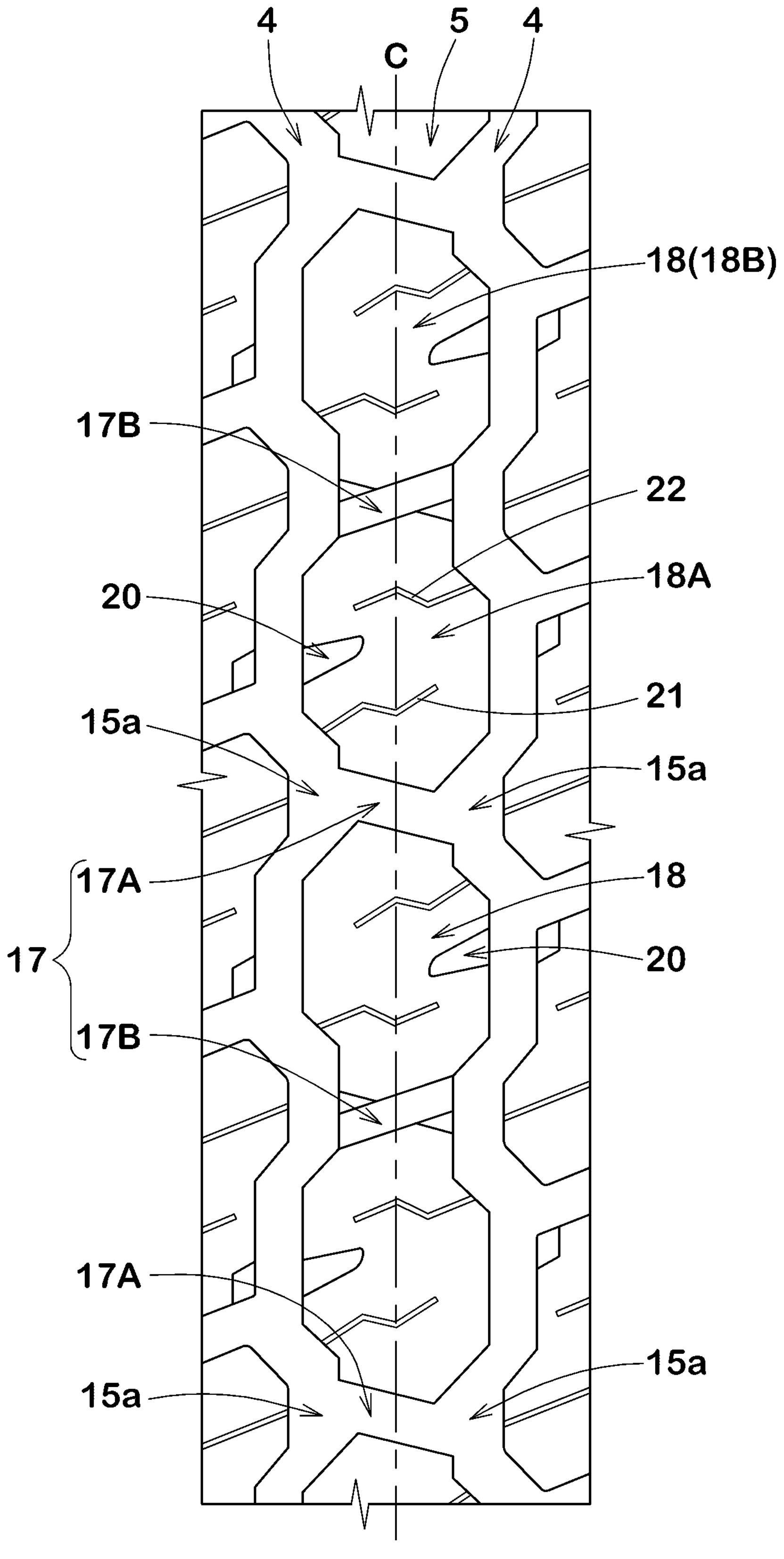
FIG. 3 is an enlarged view of a crown land region of FIG. 1.

FIG. 3 is an enlarged view of the crown land region 5. As shown in FIG. 3, the crown land region 5 is provided with a plurality of crown lateral grooves 17 extending to connect between the two second main grooves 4, for example.

It is preferred that the crown lateral grooves 17 connect between the inner longitudinal groove portions 15*a* of one of the second main grooves 4 and the inner longitudinal groove portions 15*a* of the other one of the second main grooves 4, for example. Thereby, during running, air in the crown lateral grooves 17 and the inner longitudinal groove portions 15*a* is easily guided outward in the tire axial direction, therefore, pumping sound of the crown lateral grooves 17 is decreased.

The crown lateral grooves 17 include first crown lateral grooves 17A and second crown lateral grooves 17B, for example. The first crown lateral grooves 17A are inclined in one direction (downward to the right in each drawing of this specification) with respect to the tire axial direction, for example. The second crown lateral grooves 17B are inclined in the direction opposite to the first crown lateral grooves 17A (upward to the right in each drawing of this specification), for example. The first crown lateral grooves 17A and the second crown lateral grooves 17B are arranged alternately in the tire circumferential direction.

Each of the second crown lateral grooves 17B has a groove depth smaller than that of each of the first crown lateral grooves 17A, for example. Thereby, it is possible to disperse the frequency bands of the noise generated by the first crown lateral grooves 17A and the second crown lateral grooves 17B.

The crown land region 5 in this embodiment includes a plurality of crown blocks 18 divided by the crown lateral grooves 17 described above, for example. The crown blocks 18 include first crown blocks 18A and second crown blocks 18B arranged alternately in the tire circumferential direction, for example. Each of the first crown blocks 18A in this embodiment is adjacent to one of the second crown blocks 18B via one of the second crown lateral grooves 17B having a small groove depth so as to form a block pair, for example. The crown land region 5 in this embodiment is provided with a plurality of the block pairs arranged in the tire circumferential direction, for example.

It is preferred that the first crown block 18A and the second crown block 18B have point symmetrical shapes, for example.

Figure 4:
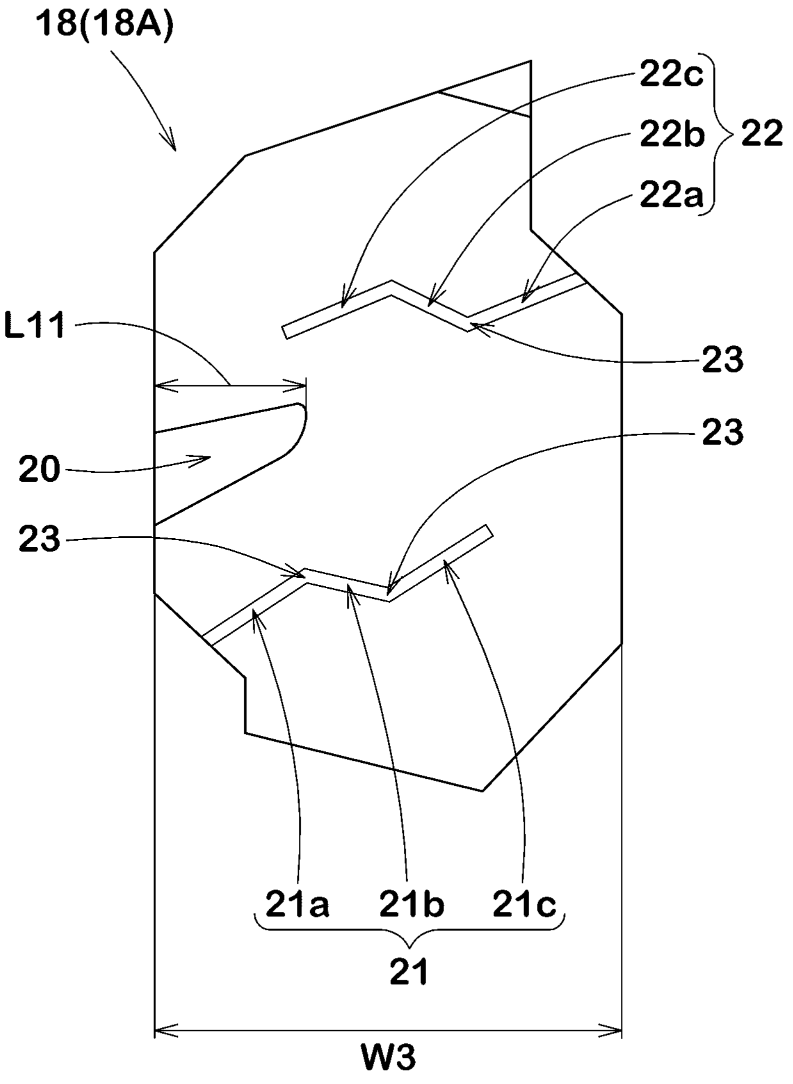
FIG. 4 is an enlarged view of one of crown blocks of FIG. 3.

FIG. 4 is an enlarged view of one of the crown blocks 18. As shown in FIG. 4, each of the crown blocks 18 is provided with a crown lateral groove 20, a first crown sipe 21 and a second crown sipe 22, for example. Note that, in this specification, the term "sipe" means a cut or a groove having a width of less than 1.5 mm.

The crown lateral groove 20 extends from one of the second main grooves 4 toward a center position in the tire axial direction of the block and terminates within the block, for example. It is preferred that the crown lateral groove 20 terminates before reaching the center position, for example. It is preferred that a length L11 in the tire axial direction of the crown lateral groove 20 is in a range of from 0.25 to 0.40 times a width W3 in the tire axial direction of the crown block 18, for example.

The first crown sipe 21 extends from one of edges of the block, with which the crown lateral groove 20 is connected, toward the center position and terminates within the block, for example. The second crown sipe 22 extends from the other edge of the block, opposite to the edge with which the crown lateral groove 20 is connected, toward the center position and terminates within the block, for example. In a more preferred embodiment, the first crown sipe 21 and the second crown sipe 22 cross the center position. The first crown sipes 21 and the second crown sipes 22 configured as such also help to decrease the impact sounds when the blocks contact with the ground.

In order to suppress excessive decrease in the rigidity of the block, it is preferred that each of the first crown sipes 21 and the second crown sipes 22 has at least one bent portion 23. In a preferred embodiment, each of the first crown sipes 21 and the second crown sipes 22 has two bent portions 23 which are convex in opposite directions to each other.

Each of the first crown sipes 21 includes a first portion 21*a*, a second portion 21*b*, and a third portion 21*c*, for example. The first portion 21*a* extends obliquely in the same direction as the second crown lateral grooves 17B, for example. The second portion 21*b* is connected with the first portion 21*a* and is inclined in the opposite direction to the first portion 21*a*, for example. The third portion 21*c* is connected with the second portion 21*b* and extends obliquely in the same direction as the first portion 21*a*, for example.

Each of the second crown sipes 22 includes a first portion 22*a*, a second portion 22*b*, and a third portion 22*c*, for example. The first portion 22*a* extends obliquely in the same direction as the second crown lateral grooves 17B, for example. The second portion 22*b* is connected with the first portion 22*a* and is inclined in the opposite direction to the first portion 22*a*, for example. The third portion 22*c* is connected with the second portion 22*b* and extends obliquely in the same direction as the first portion 22*a*, for example.

The first crown sipes 21 and the second crown sipes 22 configured as such can increase frictional force in multiple directions during running on rough terrain.

Figure 5:
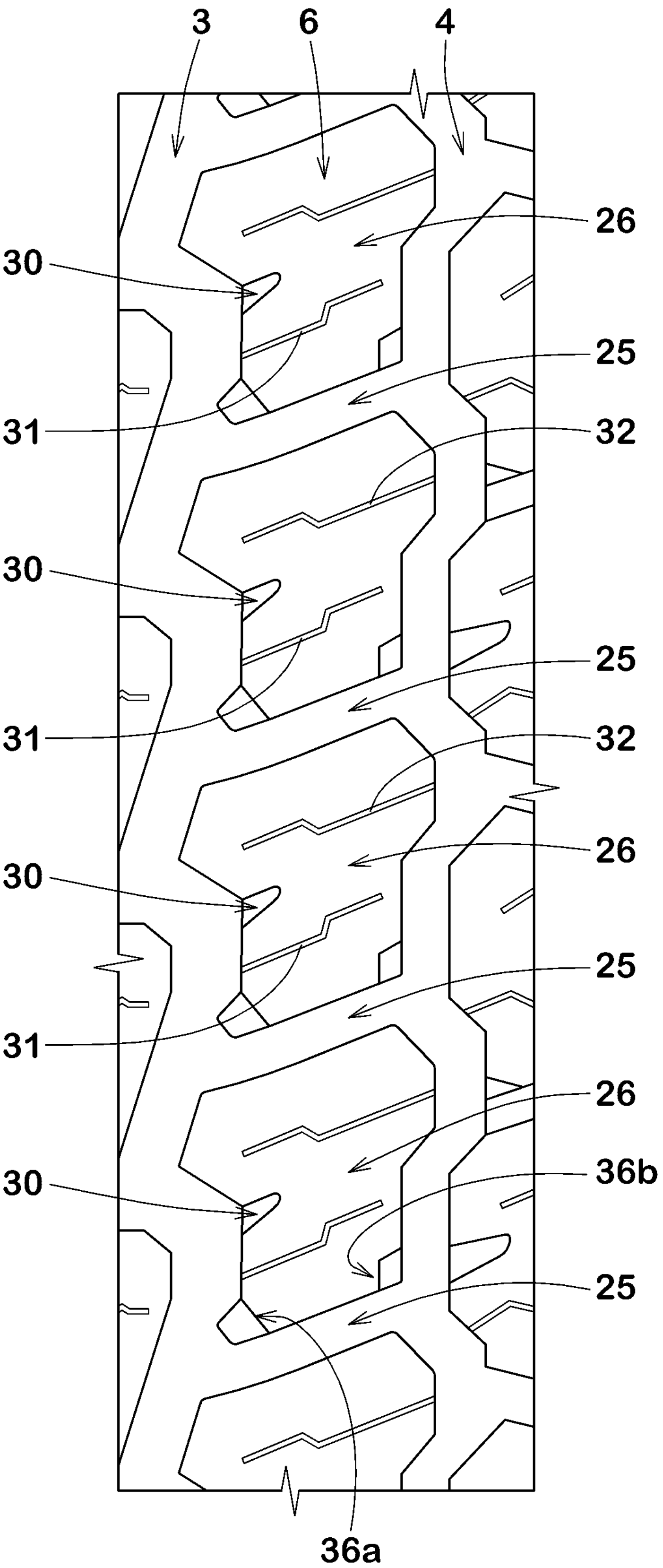
FIG. 5 is an enlarged view of one of middle land regions of FIG. 1.

FIG. 5 is an enlarged view of one of the middle land regions 6. As shown in FIG. 5, each of the middle land regions 6 is provided with a plurality of middle lateral grooves 25 each extending so as to connect between one of the first main grooves 3 and its adjacent one of the second main grooves 4, for example. It is preferred that each of the middle lateral grooves 25 extends straight and obliquely with respect to the tire axial direction, for example.

It is preferred that each of the middle lateral grooves 25 is inclined in the same direction as the second crown lateral grooves 17B, for example. In this embodiment, each of the first crown lateral grooves 17A has the larger groove depth than that of each of the second crown lateral grooves 17B, therefore, the pumping sound is relatively large. Thereby, since each of the middle lateral grooves 25 and the second crown lateral grooves 17B is inclined in the same direction, the frequency bands of the noise generated by the crown lateral grooves 17 and the middle lateral grooves 25 are dispersed.

Each of the middle lateral grooves 25 is connected with one of the first main grooves 3 so as to form a T-shaped three-way path, for example. Thereby, it becomes difficult for pitch sound of each of the lateral grooves to travel to the outside of the tire, therefore, the noise performance is improved.

Each of the middle land regions 6 in this embodiment includes a plurality of middle blocks 26 divided by the middle lateral grooves 25 described above, for example.

Figure 6:
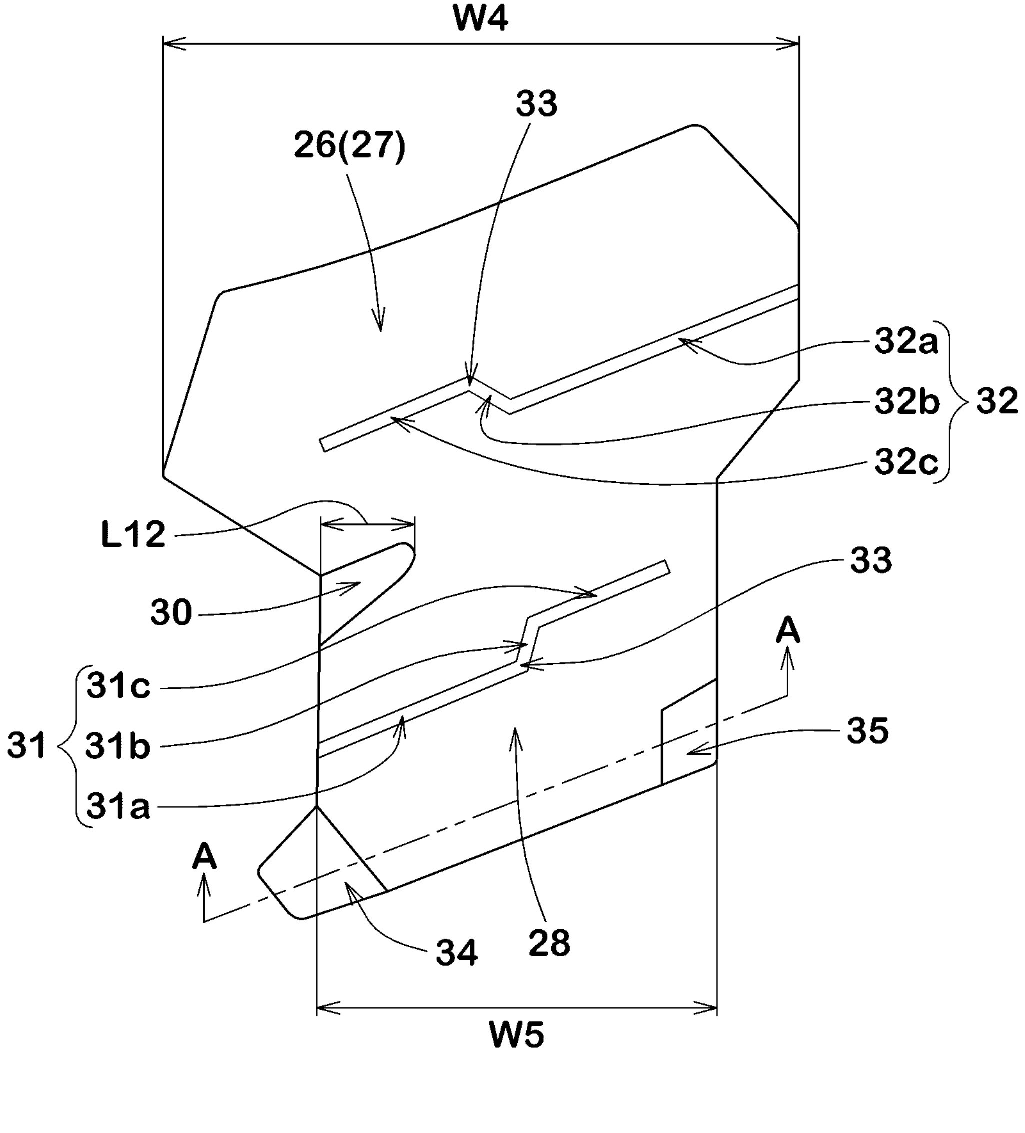
FIG. 6 is an enlarged view of one of middle blocks of FIG. 6.

FIG. 6 is an enlarged view of one of the middle blocks 26. As shown in FIG. 6, each of the middle blocks 26 includes a wide portion 27 and a narrow portion 28, for example. A width W5 in the tire axial direction between edges of a ground contacting surface of the narrow portion 28 is smaller than a width W4 in the tire axial direction between edges of a ground contacting surface of the wide portion 27, for example. It is preferred that the width W5 of the narrow portion 28 is in a range of from 0.55 to 0.70 times the width W4 of the wide portion 27, for example. The middle blocks 26 configured as such make the narrow portions 28 stick themselves deep into the road surface when running on rough terrain. The wide portions 27 suppress large deformation of the narrow portions 28, therefore, it is possible that the narrow portions 28 stuck in the road surface exert large reaction force by pushing aside the soil and the mud.

Each of the middle blocks 26 is provided with a middle lateral groove 30, a first middle sipe 31, and a second middle sipe 32, for example.

The middle lateral groove 30 extends from one of the first main grooves 3 toward a center position in the tire axial direction of the block and terminates within the block, for example. It is preferred that the middle lateral groove 30 terminates before reaching the center position, for example. The middle lateral grooves 30 configured as such can increase frictional force during running on rough terrain while maintaining the block rigidity.

It is preferred that each of the middle lateral grooves 30 has a length L12 in tire axial direction smaller than that of each of the crown lateral grooves 20 (shown in FIG. 4), for example. Specifically, it is preferred that the length L12 of the middle lateral groove 30 is in a range of from 0.55 to 0.65 times the length L11 of the crown lateral groove 20. The middle lateral grooves 30 configured as such, together with the crown lateral grooves 20, can improve the off-road performance and the noise performance in a good balance.

In each of the middle blocks 26, the first middle sipe 31 extends from one of the first main grooves 3 toward the center position and terminates within the block, for example. In a preferred embodiment, the first middle sipe 31 is provided in the narrow portion 28. The second middle sipe 32 extends from one of the second main grooves 4 toward the center position and terminates within the block, for example. In a preferred embodiment, the second middle sipe 32 is provided in the wide portion 27. In a further preferred embodiment, the first middle sipe 31 and the second middle sipe 32 extend so as to cross the center position. The first middle sipes 31 and the second middle sipes 32 moderately decrease the rigidity of the middle blocks 26, therefore, it is possible that the off-road performance is further improved.

In order to suppress an excessive decrease in the rigidity of the middle blocks 26, it is preferable that each of the first middle sipes 31 and the second middle sipes 32 has at least one bent portion 33. In a preferred embodiment, each of the middle sipes 31 and 32 has two bent portions 33 so that they are convex in opposite directions to each other.

Each of the first middle sipes 31 includes a first portion 31*a*, a second portion 31*b*, and a third portion 31*c*, for example. The first portion 31*a* extends from one of the first main grooves 3 along the middle lateral grooves 25, for example. The second portion 31*b* is connected with the first portion 31*a* and is inclined in the same direction as the first portion 31*a*, for example. Further, the second portion 31*b* is inclined at a larger angle than the first portion 31*a* with respect to the tire axial direction. The third portion 31*c* is connected with the second portion 31*b* and extends along the middle lateral grooves 25.

Each of the second middle sipes 32 includes a first portion 32*a*, a second portion 32*b*, and a third portion 32*c*, for example. The first portion 32*a* extends from one of the second main grooves 4 along the middle lateral grooves 25, for example. The second portion 32*b* is connected with the first portion 32*a* and is inclined in a direction opposite to the first portion 32*a*, for example. Thereby, the second portion 32*b* is connected with the first portion 32*a* in a bent manner so as to be away from the first middle sipe 31. The third portion 32*c* is connected with the second portion 32*b* and extends along the middle lateral grooves 25, for example.

In this embodiment, the narrow portions 28 tend to be subject to uneven wear during running on a paved road. In order to suppress the uneven wear, it is preferred that each of the narrow portions 28 is provided with a tapered portion 34 and a cut-out portion 35, for example. More specifically, the tapered portion 34 is provided in a first corner portion 36*a* (shown in FIG. 5) formed by one of the first main grooves 3 and one of the middle lateral grooves 25, for example. The cut-out portion 35 is provided in a second corner portion 36*b* (shown in FIG. 5) formed by one of the second main grooves 4 and one of the middle lateral grooves 25, for example.

Figure 7:
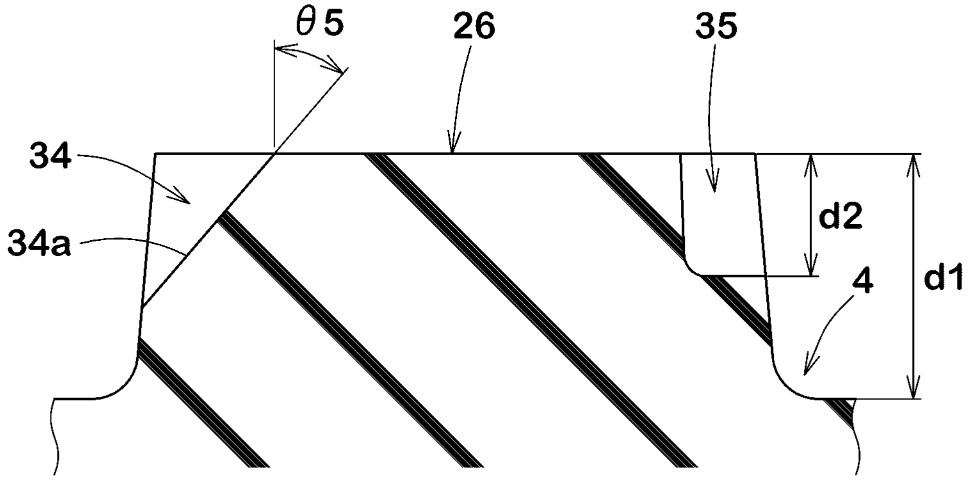
FIG. 7 is a cross-sectional view taken along A-A line of FIG. 6.

FIG. 7 is a cross-sectional view of the tapered portion 34 and the cut-out portion 35 taken along A-A line of FIG. 6. As shown in FIG. 7, the tapered portion 34 has a sloped surface 34*a* extending obliquely from a ground contacting surface of the middle block, for example. The sloped surface 34*a* in this embodiment extends from the ground contacting surface to a bottom surface of the first main groove 3, for example. The sloped surface 34*a* is inclined at an angle θ5 in a range of from 40 to 45 degrees with respect to a tire radial direction, for example.

It is preferred that the cut-out portion 35 is recessed stepwise from the ground contacting surface. It is preferred that a depth d2 of the cut-out portion 35 is in a range of from 0.20 to 0.35 times a depth d1 of each of the second main grooves 4, for example.

Figure 8:
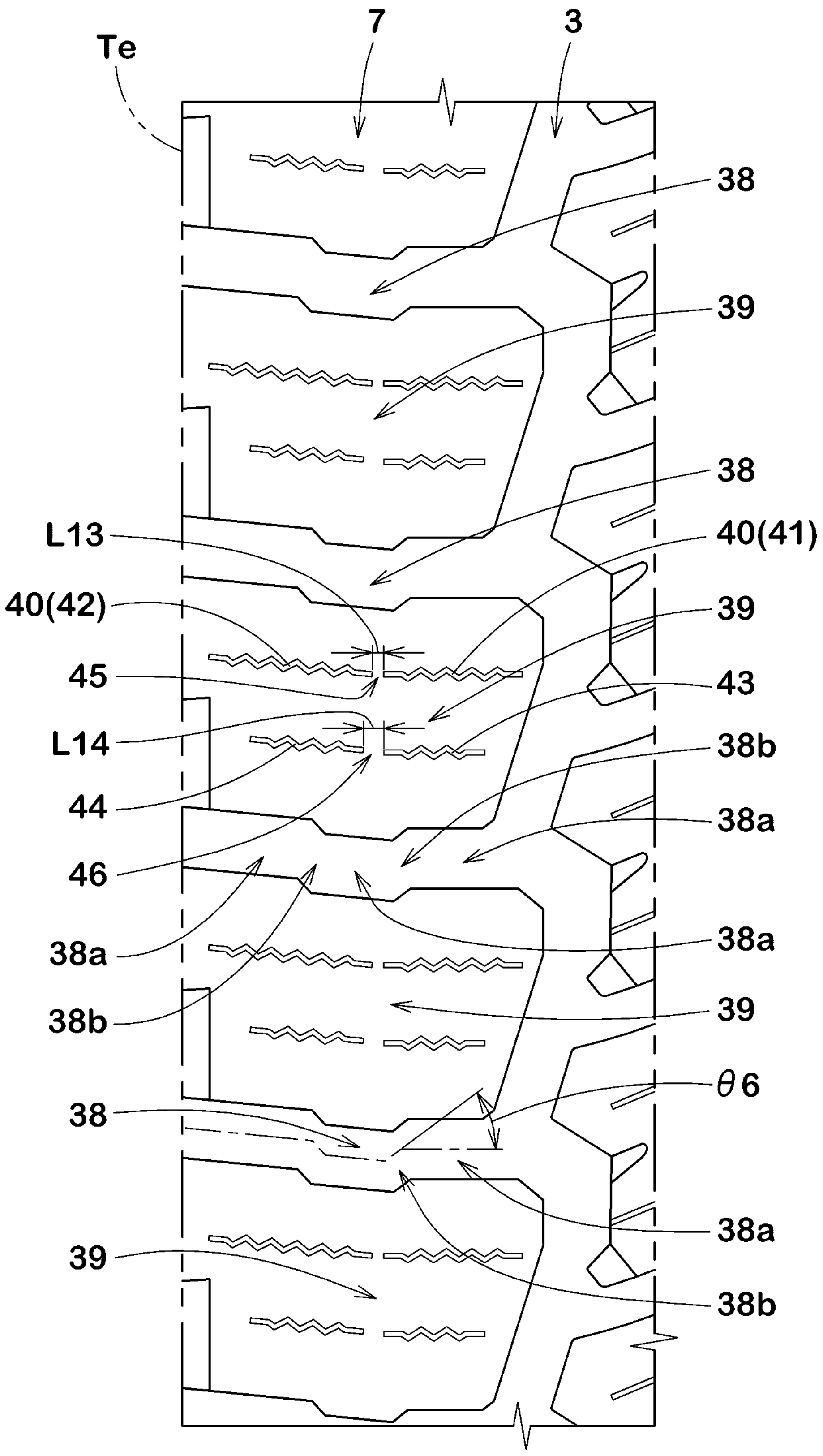
FIG. 8 is an enlarged view of one of shoulder land regions of FIG. 1.

FIG. 8 is an enlarged view of one of the shoulder land regions 7. As shown in FIG. 8, each of the shoulder land regions 7 is provided with a plurality of shoulder lateral grooves 38 extending so as to connect between one of the first main grooves 3 and its adjacent one of the tread edges Te, for example.

Each of the shoulder lateral grooves 38 includes a plurality of lateral groove portions 38*a* and connecting portions 38*b* connecting these lateral groove portions 38*a*, for example. Each of the lateral groove portions 38*a* is arranged at an angle not more than 10 degrees with respect to the tire axial direction, for example. Each of the connecting portions 38*b* is disposed between a pair of the lateral groove portions 38*a* adjacent to each other and inclined at an angle θ6 in a range of from 50 to 70 degrees with respect to the tire axial direction, for example. Each of the shoulder lateral grooves 38 in this embodiment includes three lateral groove portions 38*a* and two connecting portions 38*b*, for example. The two connecting portions 38*b* are inclined in opposite directions to each other. Thereby, frequency bands of noise generated by the shoulder lateral grooves 38, the crown lateral grooves 17, and the middle lateral grooves 25 are dispersed, therefore, it is possible that excellent noise performance is obtained.

Each of the shoulder land regions 7 in this embodiment includes a plurality of shoulder blocks 39 divided by the shoulder lateral grooves 38 described above, for example. It is preferred that each of the shoulder blocks 39 is provided with a plurality of shoulder sipes 40, for example. Each of the shoulder sipes 40 extends in a zigzag manner, for example. Further, each of the shoulder sipes 40 is configured as a closed sipe having both ends terminating within the block.

Each of the shoulder blocks 39 in this embodiment is provided with a first shoulder sipe 41 and a second shoulder sipe 42 adjacent to each other in the tire axial direction. The first shoulder sipe 41 and the second shoulder sipe 42 are adjacent to each other with a first gap 45 therebetween.

Each of the shoulder blocks 39 in this embodiment is provided with a third shoulder sipe 43 and a fourth shoulder sipe 44 adjacent to each other at different positions in the tire circumferential direction from the first shoulder sipe 41 and the second shoulder sipe 42. The third shoulder sipe 43 and the fourth shoulder sipe 44 are adjacent to each other with a second gap 46 therebetween.

It is preferred that a length L14 in the tire axial direction of the second gap 46 is larger than a length L13 in the tire axial direction of the first gap 45. It is preferred that the length L14 of the second gap 46 is in a range of from 1.5 to 2.5 times the length L13 of the first gap 45, for example. Such an arrangement of each of the sipes moderates the impact sound generated when the shoulder blocks 39 contact with the ground and can suppress increase of a sound pressure level of a specific frequency.

While detailed description has been made of the tire as an embodiment of the present invention, the present invention can be embodied in various forms without being limited to the illustrated embodiment.

Working Example (Example)

Tires of size 265/70R17 having the basic tread pattern shown in FIG. 1 were made by way of test according to the specification listed in Table 1.

As a reference, a tire was made by way of test in which each main groove is formed in a trapezoidal wave-shaped zigzag manner. Each of the test tires was tested for the noise performance, the off-road performance, and the wet performance.

Common specifications of the test tires and the test methods are as follows.

Tire rim: 17×8.0J

Tire inner pressure: 240 kPa

Test vehicle: 4WD-car with a displacement of 4300 cc

Tire mounting position: all wheels

<Noise Performance>

In-car noise was measured during the above-described test car was driven at a speed of 100 km/h on a dry road surface. The test results are indicated by an index based on the Reference being 100, wherein the smaller the numerical value, the smaller the in-car noise is, which is better.

<Off-Road Performance>

While a test driver driving the test car on rough terrain, performance was evaluated by the test driver's feeling. The results are indicated by an evaluation point based on the Reference being 100, wherein the larger the numerical value, the better the off-road performance is.

<Wet Performance>

Lateral acceleration (lateral G) of the front wheel of the test car was measured while the test car was driven on an asphalt road surface having a puddle of 5 mm deep and 20 m long, of a circuit track having a radius of 100 m. Average lateral acceleration (lateral G) at the speed of 50 to 80 km/h was calculated and the results are indicated by an index based on the comparative example 1 being 100, wherein the larger the numeric value is, the better the wet performance is.

The test results are shown in Table 1.

From the test results, it was confirmed that the tires as the examples exerted excellent off-road performance and excellent noise performance. Further, it was also confirmed that the tires as the examples maintained the wet performance.

The invention claimed is:

1. A tire comprising a tread portion comprising a plurality of main grooves extending continuously in a tire circumferential direction, wherein the main grooves include at least a first main groove and a second main groove, the first main groove is arranged closest to a tread edge among all the main grooves provided in the tread portion, the first main groove comprises first oblique portions inclined with respect to the tire circumferential direction and second oblique portions each connected with a respective one of the first oblique portions and inclined in an opposite direction to the first oblique portions, the second main groove comprises third oblique portions inclined in a same direction as the first oblique portions with respect to the tire circumferential direction, fourth oblique portions inclined in an opposite direction to the third oblique portions, and longitudinal groove portions disposed between the third oblique portions and the fourth oblique portions so that they are not directly connected and extending along the tire circumferential direction, the third oblique portions and the fourth oblique portions are arranged alternately one by one in the tire circumferential direction, one longitudinal groove portion is disposed in each connection between the third and fourth oblique portions, the tread portion includes a plurality of middle lateral grooves each extending linearly over its entire length so as to connect the first main groove and the second main groove, and each groove edge of each longitudinal groove portion includes a portion linearly extending parallel to the tire circumferential direction.

2. The tire according to claim 1, wherein the second main groove has a smaller groove width than that of the first main groove.

3. The tire according to claim 1, wherein the third oblique portion is inclined at a larger angle than the first oblique portion with respect to the tire circumferential direction.

TABLE 1

Figure 9:
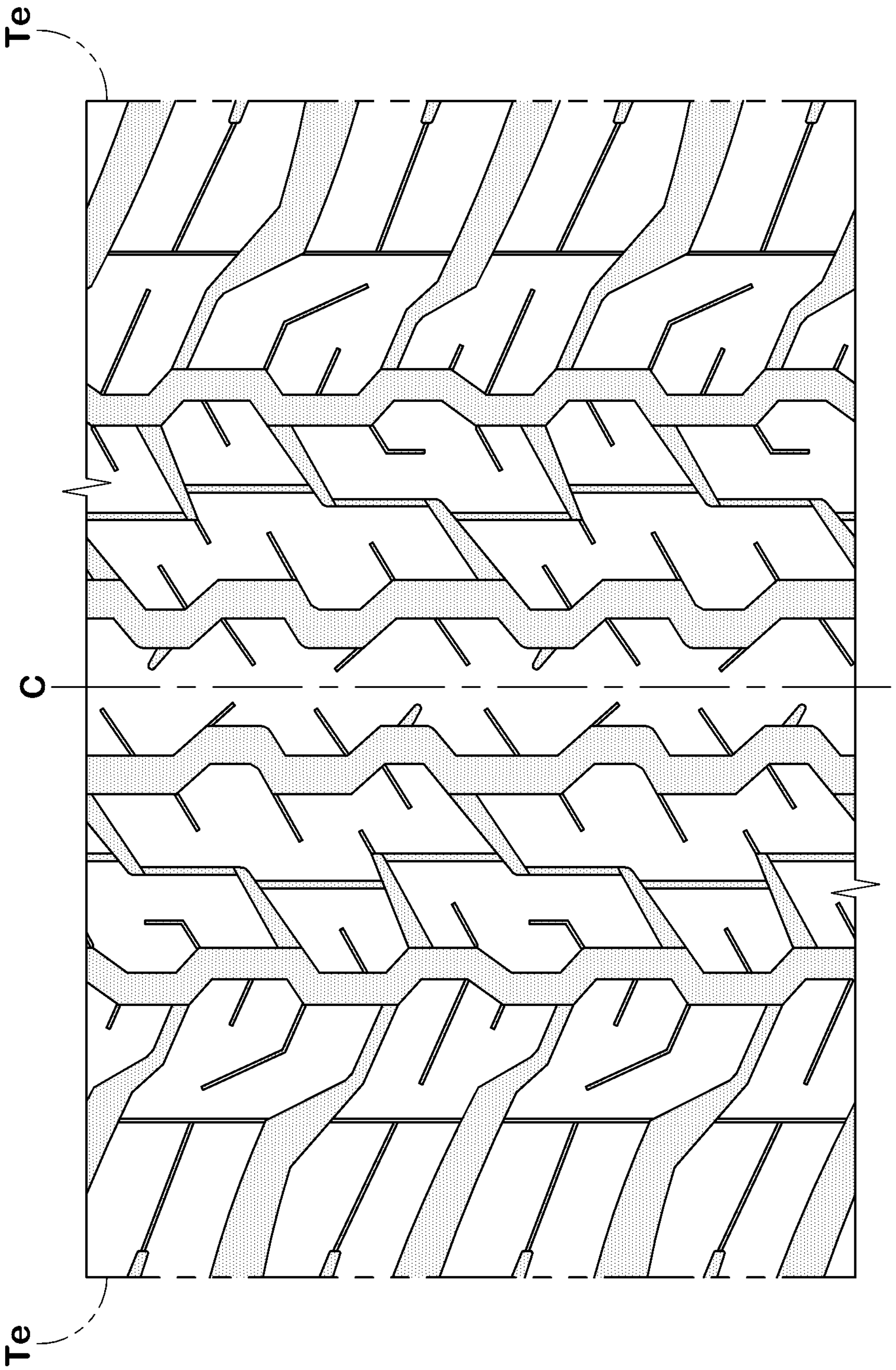
FIG. 9 is a development view of a tread portion of a tire of Reference.

| | Ref. | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Figure showing tread pattern | FIG. 9 | FIG. 1 | FIG. 1 | FIG. 1 | FIG. 1 | FIG. 1 | FIG. 1 | FIG. 1 | FIG. 1 | FIG.1 |
| Length L4 of First oblique portion/Length L5 of Second oblique portion | 1.25 | 5.00 | 3.00 | 5.50 | 5.00 | 5.00 | 5.00 | 5.00 | 5.00 | 5.00 |
| Length L10 of Outer longitudinal groove portion/Length L9 of Inner longitudinal groove portion | 1.87 | 1.95 | 1.95 | 1.95 | 1.50 | 2.50 | 1.95 | 1.95 | 1.95 | 1.95 |
| Amplitude A1 of First main groove/Tread width TW [%] | 2.3 | 4.0 | 4.0 | 4.0 | 4.0 | 4.0 | 3.0 | 5.0 | 4.0 | 4.0 |
| Amplitude A2 of Second main groove/Tread width TW [%] | 2.5 | 3.0 | 3.0 | 3.0 | 3.0 | 3.0 | 3.0 | 3.0 | 2.0 | 4.0 |
| Noise Performance [index] | 100 | 93 | 95 | 93 | 95 | 93 | 96 | 92 | 93 | 96 |
| Off-road Performance [evaluation point] | 100 | 105 | 105 | 95 | 105 | 97 | 100 | 105 | 100 | 107 |
| Wet Performance [index] | 100 | 100 | 100 | 105 | 97 | 103 | 105 | 95 | 103 | 95 |

4. The tire according to claim 1, wherein the third oblique portion is inclined at a smaller angle than the second oblique portion with respect to the tire circumferential direction.

5. The tire according to claim 1, wherein the fourth oblique portion is inclined at a larger angle than the first oblique portion with respect to the tire circumferential direction.

6. The tire according to claim 1, wherein the fourth oblique portion is inclined at a smaller angle than the second oblique portion with respect to the tire circumferential direction.

7. The tire according to claim 1, wherein each of the third oblique portion and the fourth oblique portion has a smaller length in the tire circumferential direction than that of the first oblique portion.

8. The tire according to claim 1, wherein the longitudinal groove portion has a smaller length in the tire circumferential direction than that of the first oblique portion.

9. The tire according to claim 1, wherein the first main groove and the second main groove are arranged adjacently to each other, the second groove is arranged on a tire equator or between the first main groove and the tire equator, the longitudinal groove portions of the second main groove consist of inner longitudinal groove portions and outer longitudinal groove portions arranged axially outside the inner longitudinal groove portions, the inner and outer longitudinal groove portions are arranged alternately one by one in the tire circumferential direction, and each of the middle lateral grooves has one end connected with a respective one of the first oblique portions at a circumferentially center portion thereof and the other end connected with a connection portion between a respective one of the outer longitudinal groove portions and a respective one of the fourth oblique portions.

10. The tire according to claim 1, wherein the main grooves include a pair of the second main grooves arranged so as to sandwich a tire equator, the tread portion includes a crown land region defined between the second main grooves, the crown land region is provided with a plurality of crown lateral grooves each extending so as to connect the second main grooves, the crown lateral grooves include first crown lateral grooves and second crown lateral grooves, the first crown lateral grooves are inclined to one side with respect to a tire axial direction, the second crown lateral grooves are inclined to a side opposite to the first crown lateral grooves with respect to the tire axial direction, and the first crown lateral grooves and the second crown lateral grooves are arranged alternately one by one in the tire circumferential direction.

11. The tire according to claim 10, wherein each of the second crown lateral grooves has a groove depth smaller than that of each of the first crown lateral grooves.

12. The tire according to claim 10, wherein the middle lateral grooves are inclined to the same side as the second crown lateral grooves with respect to the tire axial direction.

13. The tire according to claim 1, wherein each of the middle lateral grooves is connected with the first main groove so as to form a T-shaped three-way path.

14. The tire according to claim 1, wherein the tread portion includes a middle land region defined between the first main groove and the second main groove, the middle land region includes a plurality of middle blocks defined by the middle lateral grooves, each of the middle blocks includes a wide portion and a narrow portion, a width in a tire axial direction between edges of a ground contacting surface of the narrow portion is smaller than a width in the tire axial direction between edges of a ground contacting surface of the wide portion, and circumferential edges on both axial sides of the narrow portion include a portion linearly extending parallel to the tire circumferential direction.

15. The tire according to claim 14, wherein each of the middle blocks is provided with a semi-closed middle lateral groove, a first middle sipe, and a second middle sipe, the semi-closed middle lateral groove extends from the first main groove toward a center position in the tire axial direction of the block and terminates within the block, the first middle sipe extends from the first main groove toward the center position and terminates within the block, and the second middle sipe extends from the second main groove toward the center position and terminates within the block.

16. The tire according to claim 15, wherein each the first middle sipe and the second middle sipe has two bent portions such that they are convex in opposite directions to each other, and each of the first and second middle sipes has a crank shape having two peaks.

17. The tire according to claim 14, wherein the narrow portion is provided with a tapered portion and a cut-out portion, the tapered portion is provided in a first corner portion formed by the first main groove and one of the middle lateral grooves, the cut-out portion is provided in a second corner portion formed by the second main groove and one of the middle lateral grooves, the narrow portion has an axial edge connecting circumferential edges on both axial sides and facing the one of the middle lateral grooves, the tapered portion and the cut-out portion are provided on both axial end portions of the axial edge, the tapered portion is formed so as to protrude from one of the circumferential edges, and the cut-out portion has a circumferential edge extending parallel to the tire circumferential direction and an axial edge extending parallel to the one of the middle lateral grooves.

18. The tire according to claim 17, wherein the tapered portion has a sloped surface extending obliquely from a ground contacting surface of the middle block in a cross-sectional view thereof.

19. The tire according to claim 17, wherein the cut-out portion is recessed stepwise from a ground contacting surface of the middle block in a cross-sectional view thereof.

20. A tire comprising a tread portion comprising a plurality of main grooves extending continuously in a tire circumferential direction, wherein the main grooves include at least a first main groove and a second main groove, the first main groove is arranged closest to a tread edge among all the main grooves provided in the tread portion, the first main groove comprises first oblique portions inclined with respect to the tire circumferential direction and second oblique portions each connected with a respective one of the first oblique portions and inclined in an opposite direction to the first oblique portions, the second main groove comprises third oblique portions inclined in a same direction as the first oblique portions with respect to the tire circumferential direction, fourth oblique portions inclined in an opposite direction to the third oblique portions, and longitudinal groove portions disposed between the third oblique portions and the fourth oblique portions so that they are not directly connected and extending along the tire circumferential direction, the third oblique portions and the fourth oblique portions are arranged alternately one by one in the tire circumferential direction, one longitudinal groove portion is disposed in each connection between the third and fourth oblique portions, the tread portion includes a plurality of middle lateral grooves each extending linearly over its entire length so as to connect the first main groove and the second main groove, the main grooves include a pair of the second main grooves arranged so as to sandwich a tire equator, the tread portion includes a crown land region defined between the second main grooves, the crown land region is provided with a plurality of crown lateral grooves each extending so as to connect the second main grooves, the crown lateral grooves include first crown lateral grooves and second crown lateral grooves, the first crown lateral grooves are inclined to one side with respect to a tire axial direction, the second crown lateral grooves are inclined to a side opposite to the first crown lateral grooves with respect to the tire axial direction, the first crown lateral grooves and the second crown lateral grooves are arranged alternately one by one in the tire circumferential direction, and each of the first and second crown lateral grooves intersects with a respective one of the longitudinal groove portions of one of the second main grooves and a respective one of the longitudinal groove portions of the other second main groove.

* * * * *